United States Patent
Buckingham et al.

(10) Patent No.: US 8,374,722 B2
(45) Date of Patent: Feb. 12, 2013

(54) ROBOTIC ARM

(75) Inventors: Robert Oliver Buckingham, Abingdon (GB); Andrew Crispin Graham, Bristol (GB)

(73) Assignee: Oliver Crispin Robotics Limited (GB)

( * ) Notice: Subject to any disclaimer, the term of this patent is extended or adjusted under 35 U.S.C. 154(b) by 261 days.

(21) Appl. No.: 12/819,621

(22) Filed: Jun. 21, 2010

(65) Prior Publication Data

US 2011/0054687 A1    Mar. 3, 2011

Related U.S. Application Data

(63) Continuation of application No. PCT/GB2008/004259, filed on Dec. 22, 2008.

(30) Foreign Application Priority Data

Dec. 21, 2007  (GB) .................................. 0725095.4

(51) Int. Cl.
*B25J 9/06* (2006.01)

(52) U.S. Cl. ............... 700/253; 74/490.05; 180/168; 104/138.2; 701/408

(58) Field of Classification Search .......... 700/245, 700/250–253, 262; 74/490.01–490.06; 180/168; 104/138.2; 701/1, 23, 25, 116, 408, 431, 701/436
See application file for complete search history.

(56) References Cited

U.S. PATENT DOCUMENTS

| | | | | |
|---|---|---|---|---|
| 3,060,972 A | * | 10/1962 | Sheldon | 138/120 |
| 3,190,286 A | * | 6/1965 | Stokes | 600/141 |
| 3,266,059 A | * | 8/1966 | Stelle | 623/62 |
| 3,270,641 A | * | 9/1966 | Gosselin | 396/138 |
| 3,456,514 A | * | 7/1969 | Gebendinger | 74/110 |
| 3,497,083 A | * | 2/1970 | Anderson et al. | 414/738 |
| 3,557,780 A | * | 1/1971 | Sato | 600/141 |
| 4,347,837 A | * | 9/1982 | Hosono | 600/139 |
| 4,686,963 A | * | 8/1987 | Cohen et al. | 600/141 |
| 4,832,473 A | * | 5/1989 | Ueda | 359/367 |
| 4,834,069 A | * | 5/1989 | Umeda | 600/142 |
| 4,846,573 A | * | 7/1989 | Taylor et al. | 356/241.4 |
| 4,870,951 A | * | 10/1989 | Suzuki | 600/130 |
| 4,890,602 A | * | 1/1990 | Hake | 600/144 |
| 5,174,277 A | * | 12/1992 | Matsumaru | 600/142 |
| 5,178,129 A | * | 1/1993 | Chikama et al. | 600/142 |
| 5,448,989 A | * | 9/1995 | Heckele | 600/142 |
| 5,624,380 A | * | 4/1997 | Takayama et al. | 600/146 |

(Continued)

FOREIGN PATENT DOCUMENTS

EP    0136719 A2    4/1985
EP    0626604 A2    11/1994

(Continued)

OTHER PUBLICATIONS

International Search Report and Written Opinion of the International Searching Authority; PCT/GB2008/004259; Mar. 11, 2009; 21 pages.

*Primary Examiner* — Drew Brown
(74) *Attorney, Agent, or Firm* — St. Onge Steward Johnston & Reens LLC

(57) ABSTRACT

A robotic arm is provided, for example for inspecting a rotary machine such as a gas turbine engine. The arm has a plurality of groups of links having articulations therebetween for movement in a first plane, the groups having articulations with respect to each other for movement in a second orthogonal plane. Thus the arm can move around objects such as aerofoils in the engine, and also move up or down to remain close to the rotary surface of the machine.

25 Claims, 3 Drawing Sheets

U.S. PATENT DOCUMENTS

| | | | |
|---|---|---|---|
| 5,765,443 A * | 6/1998 | Murase et al. | 74/490.05 |
| 5,881,832 A * | 3/1999 | Zitz et al. | 180/169 |
| 5,897,488 A | 4/1999 | Ueda | |
| 6,817,974 B2 * | 11/2004 | Cooper et al. | 600/142 |
| 6,837,846 B2 * | 1/2005 | Jaffe et al. | 600/114 |
| 6,858,005 B2 * | 2/2005 | Ohline et al. | 600/141 |
| 6,974,411 B2 * | 12/2005 | Belson | 600/114 |
| 6,984,203 B2 * | 1/2006 | Tartaglia et al. | 600/114 |
| 7,543,518 B2 * | 6/2009 | Buckingham et al. | 74/490.05 |
| 7,596,451 B2 * | 9/2009 | Stoller et al. | 701/466 |
| 7,698,937 B2 * | 4/2010 | Neidhardt | 73/152.57 |
| 8,069,747 B2 * | 12/2011 | Buckingham et al. | 74/490.04 |
| 8,126,591 B2 * | 2/2012 | Buckingham et al. | 700/245 |
| 8,182,418 B2 * | 5/2012 | Durant et al. | 600/142 |
| 2004/0138525 A1 * | 7/2004 | Saadat et al. | 600/104 |
| 2005/0197536 A1 * | 9/2005 | Banik et al. | 600/179 |
| 2005/0250990 A1 * | 11/2005 | Le et al. | 600/114 |
| 2009/0095112 A1 * | 4/2009 | Buckingham et al. | 74/490.05 |
| 2009/0099420 A1 * | 4/2009 | Woodley et al. | 600/142 |
| 2009/0216083 A1 * | 8/2009 | Durant et al. | 600/130 |
| 2010/0116080 A1 * | 5/2010 | Pistor et al. | 74/490.05 |
| 2010/0116081 A1 * | 5/2010 | Pistor et al. | 74/490.05 |
| 2010/0145550 A1 * | 6/2010 | Ross-Martin | 701/2 |
| 2010/0234988 A1 * | 9/2010 | Buckingham et al. | 700/245 |

FOREIGN PATENT DOCUMENTS

| | | |
|---|---|---|
| JP | 4171184 A | 6/1992 |
| JP | 7001376 A | 1/1995 |
| JP | 2005081499 A | 3/2005 |
| JP | 2005193344 A | 7/2005 |
| WO | 0216995 A2 | 2/2002 |

\* cited by examiner

ROBOTIC ARM

CROSS-REFERENCE TO RELATED APPLICATIONS

The present application is a continuation of pending International patent application PCT/GB2008/004259 filed on Dec. 22, 2008, which designates the United States and claims priority from British patent application number 0725095.4 filed on Dec. 21, 2007, the content of which is incorporated herein by reference.

FIELD OF THE INVENTION

This invention relates to a robotic arm, for example for use in a rotary machine, such as for inspecting and/or repairing blades of a gas turbine engine.

BACKGROUND OF THE INVENTION

Such arms comprise a plurality of articulated links. In some, all of the articulations are 'universal', or at least may bend in more than one plane, so that the arm can adopt various shapes. Others have hinge joints, which give a stiffer structure, but which are more limited in movement. Hinge joints can be used at alternating angles (eg perpendicular to each other) to improve flexibility of shape. These require separate control of each articulation. Where it is necessary for the arm to navigate a curved surface or other non-planar surface, it has been considered necessary to use an arm with universal joints. Such surfaces may for example include the interior surface of a body cavity such as the stomach.

There is a need for inspecting the condition of gas turbine blades, and also for repairing them. In the past it has been necessary to provide apertures in the casing of the engine at intervals so that any blade can be inspected. Alternatively it has been necessary to dismantle the engine. It would be advantageous to eliminate the need for this.

A problem with inspecting a compressor from the outside via the air intake is that the blades form obstacles to any tool inserted therein. Moreover the position of these obstacles varies depending upon the build of the machine as well as the position in which they have come to rest after the engine has been stopped. Also, the cross-sectional shape of each blade varies from the base to the tip such that the unobstructed space between the blades is a complex volume, which changes in cross-sectional shape depending upon the distance away from the rotor surface.

SUMMARY OF THE INVENTION

According to the present invention there is provided a robotic arm for advancing adjacent a curved surface, the arm comprising a plurality of articulated links arranged sequentially in at least two groups, each group comprising at least three links articulated with respect to each other for relative movement substantially in a first plane, the groups being articulated with respect to each other for movement substantially in a second plane, which second plane is inclined with respect to the first plane, and a controller arranged to control movement of the links in the first plane, and to control movement of the groups in the second plane for remaining a predetermined distance from the surface of the machine.

This structure allows the arm to be advanced adjacent a surface, with the controller able to move the arm sideways in the first plane for example to avoid objects projecting from the surface. Should the tip of the arm then no longer be adjacent the surface, or be too close to it, due to the curved nature of the surface, the controller may then be used to move the arm effectively upwards or downwards in the second plane. Such an arm thus achieves flexibility of shape whilst being stiffer than an arm with universal joints.

For example, in a compressor, the arm may advance along or close to the substantially cylindrical surface of the rotor. The controller may be used to move the tip or distal end of the arm sideways, by means of the articulation between the links in the first plane, to avoid the blades. Having moved sideways, the distal end of the arm may no longer be adjacent the surface of the rotor, due to the cylindrical nature of the surface. The controller may then be used to move the tip of the arm effectively downwards or upwards in the second inclined plane by means of the articulations between the groups, so as to approach the surface of the rotor. It is preferable for the arm to remain close to the surface along its length due to the changing shape of each blade from root to tip.

The second plane may be substantially perpendicular to the first plane, or may be at a lesser angle to the first plane, e.g. between 30 and 60 degrees, or 45°. The links in each group may for example have first axes of articulation therebetween, and the groups may have second axes of articulation therebetween, and the second axes may be substantially perpendicular to the first axes.

One or more of the articulations between the groups may comprise further groups of links having a plurality of articulations or hinges. Furthermore, depending upon the shape of the surface to be navigated, the angle of the first and second planes may vary along the length of the arm. Thus, the arm may effectively comprise a series of arms as defined above.

The arm may include a first sensor arranged to sense the position of an object in the path of the arm, for example projecting from the surface. The controller may receive information from the first sensor for use in controlling movement of the arm at least in the first plane to avoid the object.

Optionally, to facilitate remaining close to the surface, at least one of the groups of links (e.g. the most distal group) comprises a second sensor for sensing whether the group of links is adjacent the surface, for example by measuring the distance between a link in the group (e.g. the most distal link) and the surface. The controller may be arranged to receive information from the or each second sensor for use in calculating and applying the required movement of the arm in the second plane in order to approach or to move away from the surface.

At least one link in each segment may comprise a bearing member or surface for bearing against an adjacent surface. For example, some or all of the links may have wheels for running along the surface. This has the advantage of bearing some of the weight of the arm. This is desirable in some situations, since it alleviates the problem that the weight of the arm if unsupported can cause the arm shape to vary from the theoretical.

The controller may control movement in the first plane by controlling the position of the most distal link in each group, with the group of links thus each adopting a curved shape. Movement between the groups in the second plane may be controlled by controlling the position of the most proximal link in each group. Thus the arm may include actuators arranged for moving the most distal link and the most proximal link in the group of links. The actuators may be control cables or wires terminating and being fixed to the associated link, for example three cables spaced around the link, as described in WO 0216995.

Preferably, the control wires are arranged on pulleys at each articulation point, in order to guide the wires with low friction. The wires may each run between two pulleys. However, advantageously, the wires may each am between a single pulley and a plain external bearing or bearing surface. For example, the pulleys may conveniently have axes corresponding to the first axes of articulation between the links. Thus the pulleys may be mounted on articulation pins between the links. Thus a pair of wires may run on either side of a pulley.

The outer surface of each link may be at least partially covered by a rubbing strip for bearing against adjacent surfaces, such as the aerofoils in a compressor, in case contact should be made. The arm also may include at least one further sensor for sensing an obstacle adjacent the arm. This allows the controller to move the body of the arm should it come into contact or into proximity with a blade or other object.

In one embodiment, the robotic arm may be provided with a "spatial" tip, which tip comprises a plurality of links which are each articulated for movement in at least two planes. Such a tip can be used for example to inspect a blade once the robotic arm has reached the required blade. In this case, a sensor or tool may be mounted on the end of the tip, and may be moved over the blade by controlling the shape of the tip.

The invention also comprises a method of advancing a robotic arm to reach a predetermined object through a plurality of rows of objects, the objects in each row having a known size and spacing relative to one another, and the rows being offset with respect to each other, the method comprising: advancing the arm between the objects in each row in turn to measure the position of at least one object in each row; withdrawing the arm; calculating the positions of all objects in all rows; calculating a path between the obstacles for reaching the predetermined object; and advancing the arm along the path.

Once the relative positions of all of the objects, such as compressor blades, are known, a path for the arm can be calculated which is either the shortest path, the path with the least curvature (in the first plane) or the path with the least offset (i.e. curvature in the second plane), or a combination of these. This can be from a chosen optimal starting point, between any two objects.

The invention also comprises a method of selecting a device for inspecting a rotary machine comprising a surface and a plurality of rows n, n+1, of spaced objects, the objects in each row being in fixed relative positions, and the rows being in variable relative positions, the method comprising (a) determining the positions of the objects relative to each other in each row; (b) determining the position for the row n+1, relative to the position of row n, which results in the least optimal path for the device between the objects in row n and n+1; (c) storing the said position of row n+1 and storing the said path; repeating steps (b) and (c) for the next adjacent row of objects; summing the said paths to determine the least optimal path through the machine, determining the required shape of the device when following the said least optimal path; and selecting a device which is suitable for following the said path. The least optimal path may be that which is the longest, has the greatest curvature, or the greatest offset, or a combination of these. Preferably, this method is performed for every interstice between objects in each row.

This gives the "worst case scenario" for reaching a particular blade in the machine to be inspected, whichever position it has stopped in, and however the aerofoils are positioned due to build configuration. Thus the optimal device (e.g. the smallest, shortest device, or device with the fewest links) which is suitable will be known and can be selected for use.

BRIEF DESCRIPTION OF THE DRAWINGS

In order that the invention may be more readily understood, reference will now be made to the accompanying drawings in which.

DETAILED DESCRIPTION OF THE INVENTION

Figure 1:
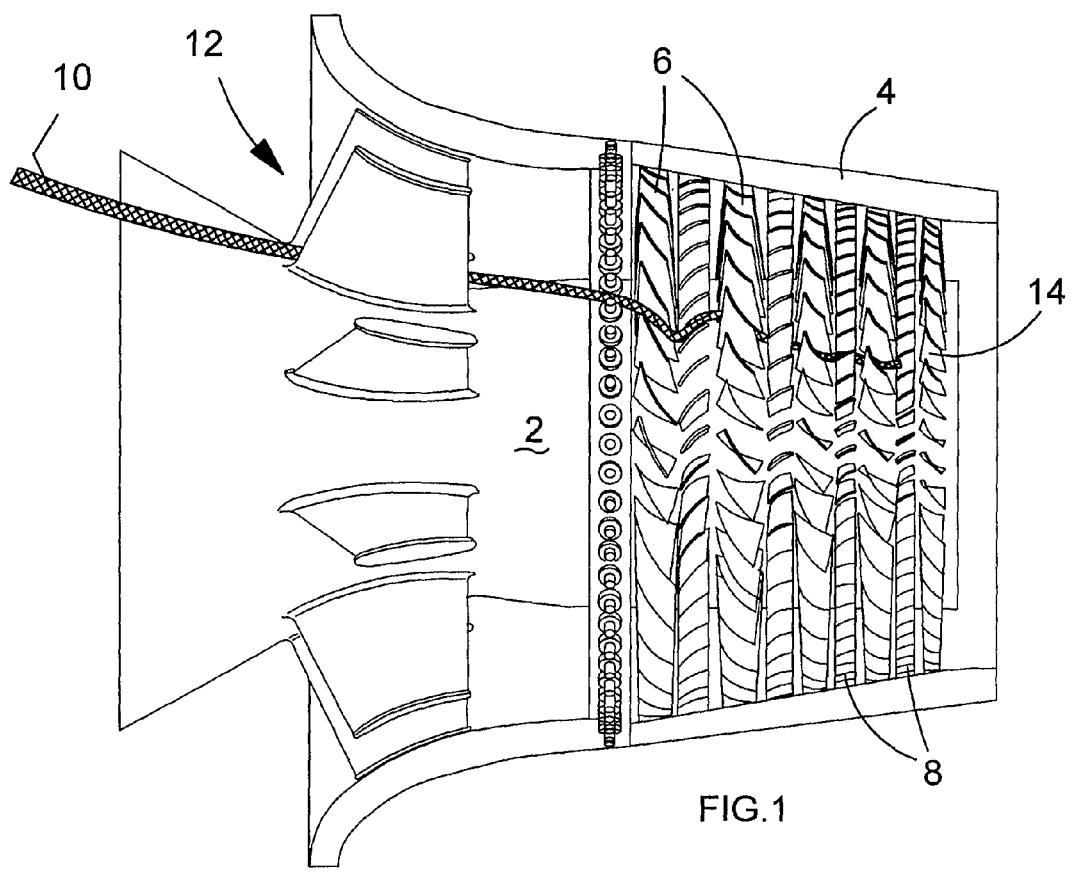
FIG. 1 is a cross-sectional view of part of a compressor of a gas turbine engine showing a robotic arm in accordance with one embodiment of the present invention.

Referring to FIG. 1, a rotary machine comprising a gas turbine engine has a central rotor 2 and an outer casing 4. Several rows of rotor blades 6 are mounted on the rotor 2, and several rows of stator vanes 8 are mounted on the outer casing 4. Each row of stator vanes 8 is positioned between adjacent rows of rotor blades 6.

A robotic arm 10 is shown extending from the air intake 12 of the engine between the rotor blades and vanes of each row in order to reach a target blade 14.

It will be appreciated that the relative positions of the rotor blades 6 with respect to the stator vanes 8 varies depending both on build configuration, and also on where the rotor comes to rest when the engine is switched off. Therefore it is not possible to determine, from outside the engine, the best path to take to reach the target blade 14. However it is generally known that the blades 6 or vanes 8 in each row are substantially identical, and are substantially evenly spaced. Therefore, if the position of one blade 6 or vane 8 in each row is determined, then the relative positions of all of the blades and vanes can be calculated.

Figure 4:
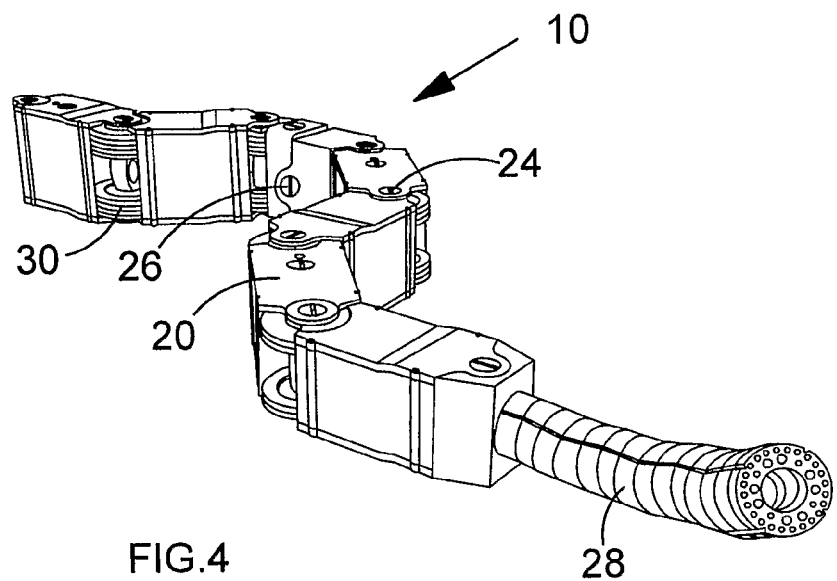
FIG. 4 is a perspective view of the robotic arm of FIG. 1.
Figure 5:
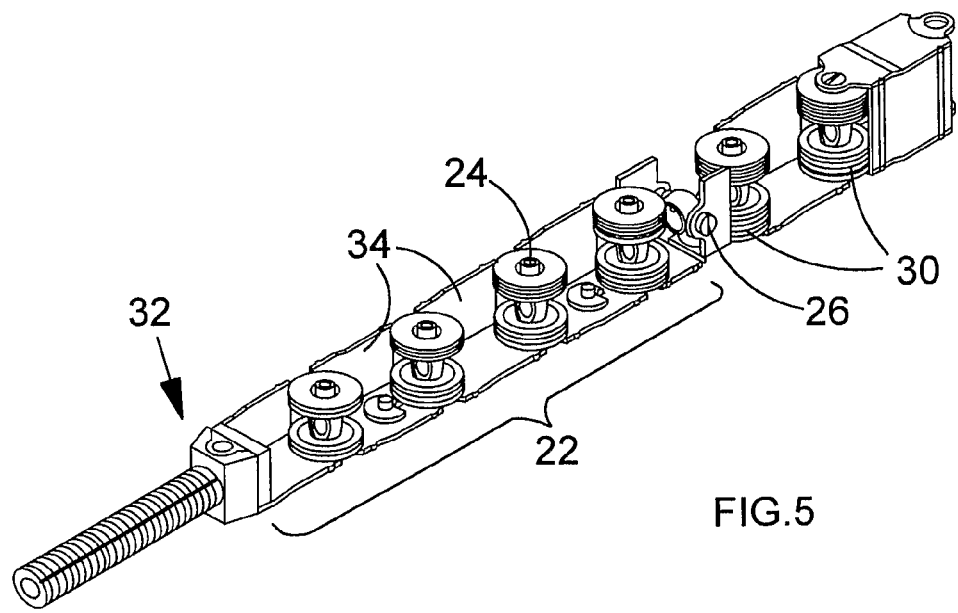
FIG. 5 is a further perspective view of the robotic arm shown in FIG. 4, with parts removed.

Referring now to FIGS. 4 and 5 the robotic arm 10 has an elongate shape and comprises a plurality of sequential articulated links 20 which are divided into groups 22 each comprising, in this example, four links 20. Each link 20 is articulated to the adjacent link 20 by means of a vertical hinge pin 24 for relative movement about the axis of the hinge pin 24 in the first or horizontal plane. Each group 22 is articulated to the neighbouring group by means of a horizontal hinge pin 26 for movement about the axis of the hinge pin 26 for relative movement in the second or vertical plane. At the distal end of the arm 10 is a further "spatial" tip section 28 which comprises a series of elements 28 articulated for movement about both planes so as to be able to move in a snake-like manner. This may also be operated by groups of wires (at least three) terminating at various control elements in the spatial section. Such an arm is described in our publication WO0216995.

It is also possible that, in a similar way, each link 20 of the arm may comprise a plurality of "passive" articulated links, and thus be able to assume a curved shape between the controlled articulations 24, 26.

As an example, the vertical articulations may have an angular range typically of up to about ±30° or ±20°, and the horizontal articulations may have an angular range of about ±10°.

Movement of the arm 10 is controlled using control wires (not shown for clarity) which pass around either side of pulleys 30 at each articulation. One pair of wires terminates at the link beyond each vertical articulation, whilst the remainder pass on to the pulleys further towards the distal end 32 of the arm 10. Thus the stack of pulleys 30 is larger towards the proximal end, and the depth of the arm 10 may therefore be larger. Between the pulleys 30 the arm 10 is provided with sidewalls or wire bearing surfaces 34. Considering a wire on one side of the arm 10, when the arm bends away from that side at a particular articulation, the wire rolls on the pulley 30. When the arm bends towards that side at the articulation, the wire bears against the inside bearing surface of the wall 34. Thus each wire is contained between the pulley 30 and the sidewall 34.

Alternatively, as noted above, the links in each group may be 'passive', such that one pair of wires terminates at the most distal link in the group, for bending the group together in a curved shape.

The horizontal articulations may be controlled in a similar manner. For example, an additional pair of wires may pass through each horizontal articulation and terminate at the link beyond the articulation (ie the most proximal link in the group of links articulated in the vertical plane). Alternatively the wires may terminate at a more distal link such as the link beyond the next vertical articulation. In this case, two pairs of wires terminate at the said link, and are together used to control movement in each of the first and second planes.

It will be appreciated that arms with different numbers of links and different angles of articulations may be provided depending upon the required use. It is also possible that the articulations between links in one group may be at a different angle from the articulations between the links in another group. The articulations between the groups may also be at various angles along the length of the arm.

In order to inspect an object within a rotary machine, such as an aerofoil (blade or vane) in a compressor, it is first necessary to establish the positions of all of the objects or aerofoils within a machine. It may for example be known that the aerofoils in each row are of substantially the same size, and are substantially evenly spaced. Therefore if the position of one of the aerofoils in each row is established, a model can be constructed of all of the aerofoils in all of the rows. The robotic arm may therefore be introduced into the machine in order to measure the position of an aerofoil in each row.

Figure 2:
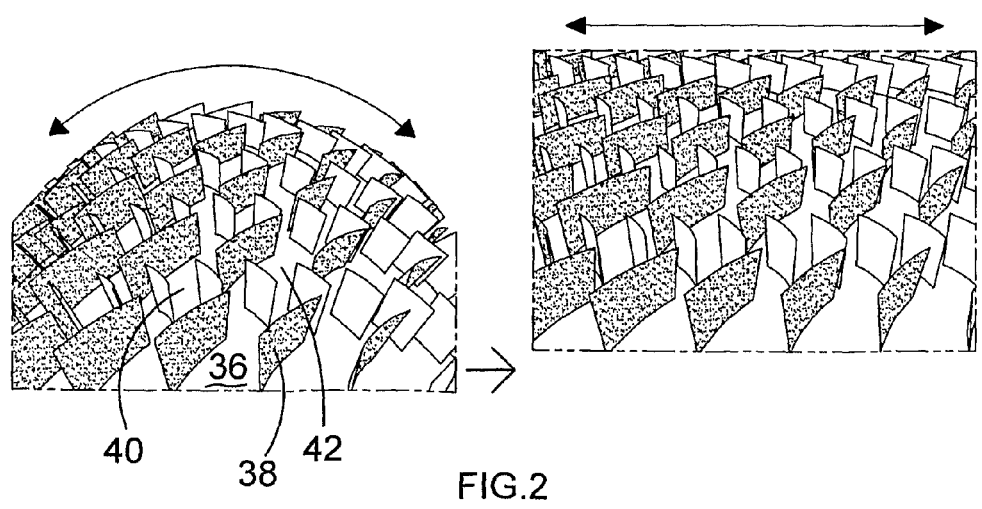
FIG. 2 is a diagrammatic respective view of the blades and vanes in the compressor of FIG. 1.

Referring now to FIG. 2, this is done by advancing the arm through the blade interstice 36 between two blades 38 in a row of rotor blades, and through the adjacent vane interstice 40 between two stator vanes 42 in the adjacent row of stator vanes. The robotic arm is introduced into the first interstice 36. When reaching the junction between the first row of rotor blades and first row of stator vanes a sensor such as a camera on the distal end of the arm records the position of an adjacent vane 42. The position of the vane 42 may be determined either by reference to the known position of the blade 38, or by reference to the known position of the robotic arm, that position being known from the controller. The position of the first interstice 36 and the adjacent vane 42 is therefore known, and it can be determined by the controller which vane interstice 40 on either side of the adjacent vane 42 should be taken. This can be done by converting the detected position data into a model of the rows.

Figure 3:
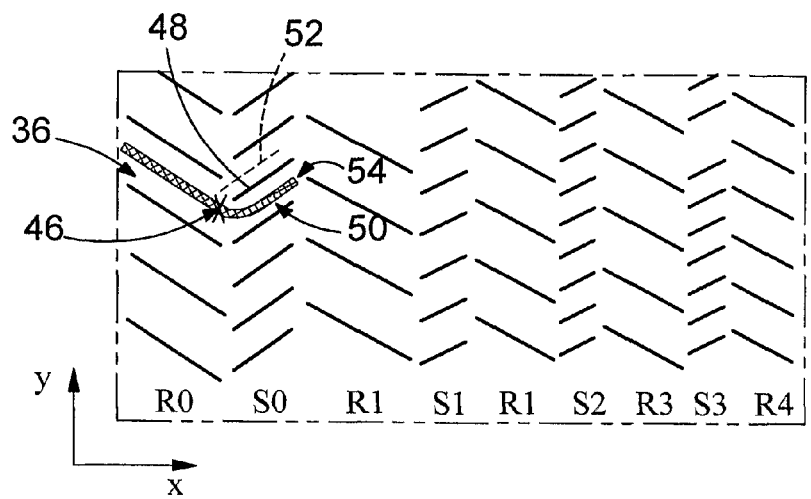
FIG. 3 is a diagrammatic plan view of the blades and vanes shown in FIG. 2.

Referring to FIG. 3, the model may be a simplified version of the machine, in which the aerofoils are assumed to be planar with constant or zero thickness and to lie on a plane. For example, when the arm is at the centre of an interstice 36, as indicated by the position 46, it notes the position of an adjacent stator vane 48. The first rotor row RO and the first stator row SO may then be modeled, and it is then known that the path to the centre of a first of interstice 50 in the stator row SO is wider and shallower than the alternative path to the centre of an adjacent interstice 52 (shown in broken lines). The arm may thus be controlled to pass through the first interstice 50 and the process is repeated at the next junction 54. The arm continues in this manner until it reaches the end of the machine, at row R4. This allows a complete map or model of the machine to be constructed as shown in FIG. 3.

It is possible to construct a similar model at various different heights from the rotor surface, or cylindrical sections at different radii, in order to form a more complete model of the machine taking account of the cross-sectional change of the aerofoils from root to tip.

Figure 6:
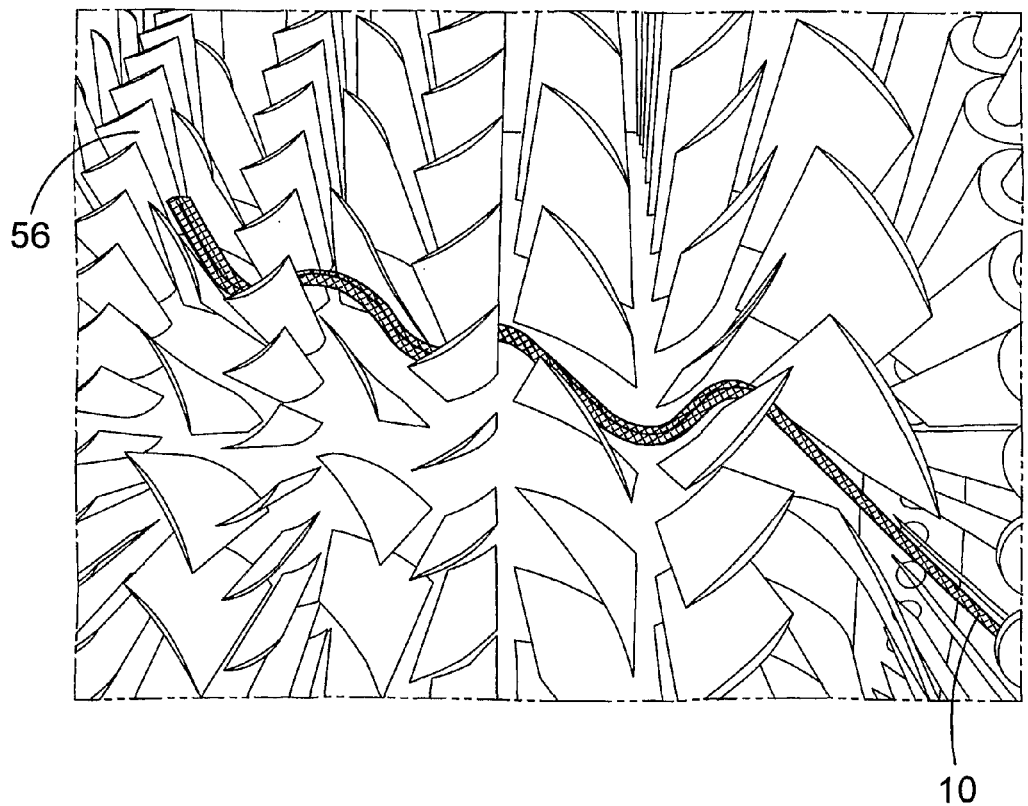
FIG. 6 is a perspective view of the inside of a compressor.

A known aerofoil, such as a stator blade in row S3, for example selected blade 56, may be selected for inspection or repair. It is then possible to calculate from the model the "best path" for the arm to take to the reach the selected blade 56. Once a possible path has been calculated, the arm may be advanced into the machine as shown in FIG. 6.

For inspection of any particular machine, it is advantageous to be able to choose an arm of suitable parameters such as length, width, number of articulations in each plane (i.e. number of links, number of link groups), etc. Therefore, a model of the machine can be constructed as above, and a "worst case" path through the compressor to any selected blade may be calculated. The length, width, and angle of the worst case path is therefore known, such that a robotic arm fitting the minimum requirements to follow such a path may be selected for use with that engine.

In order that the arm may be selected for the machine in whichever position the machine has stopped, a number of similar models may be constructed corresponding to all possible positions of the stator rows relative to the rotor rows. In each case, the worst case path may be calculated. It is then possible to select the arm according to the worst of the worst case paths, which will therefore be suitable.

The invention claimed is:

1. A robotic arm for advancing adjacent a curved surface, the robotic arm comprising;
   a plurality of articulated links arranged sequentially along the arm in at least two groups, wherein a first group comprises at least three links articulated with respect to each other for relative movement substantially in a first plane only, and a second group comprises at east three links articulated with respect to each other for relative movement substantially in a second plane only, wherein an articulation is provided between the first group and the second group so that the second plane can be inclined with respect to the first plane, and
   a controller arranged to control movement of the links in the first group, and to control movement about the articulation between the first group and the second group for remaining a predetermined distance from the curved surface.

2. The robotic arm of claim 1, wherein the second plane is substantially perpendicular to the first plane.

3. the robotic arm of claim 2, wherein the second plane is inclined between 30 and 60 degrees to the first plane.

4. The robotic arm of claim 1, wherein the links in the first group and second group have first axes of articulation therebetween, and the first group and the second group have second axes of articulation therebetween, the second axes being substantially perpendicular to the first axes.

5. The robotic arm of claim 1, further comprising a first sensor arranged to sense the position of an object adjacent the arm.

6. The robotic arm of claim 5, wherein the controller is arranged to receive information from the first sensor for use in controlling movement of the arm at least in the first plane for avoiding the object.

7. The robotic arm of claim 5, wherein at least one of the groups of links comprises a second sensor arranged to sense the relative position of the surface.

8. The robotic arm of claim 7, wherein the controller is arranged to receive information from the first sensor or each second sensor for use in calculating and applying the required movement of the arm in the second plane in order to approach or to move away from the surface.

9. The robotic arm of claim 5, wherein the arm includes at least one further sensor for sensing an obstacle adjacent the arm.

10. The robotic arm of claim 9, wherein the controller is arranged to receive information from the further sensor for moving the body of the arm.

11. The robotic arm of claim 1, wherein at least one link in each group includes a bearing member or surface for bearing against an adjacent surface.

12. The robotic arm of claim 1, wherein the controller is arranged to control movement of the links in the first plane by controlling the position of the most distal link in each group.

13. The robotic arm of claim 1, wherein the controller is arranged to control movement between the first group and the second group in the second plane by controlling the position of the most proximal link in each group.

14. The robotic arm of claim 1, wherein the position of the links is controlled using control cables.

15. The robotic arm of claim 14, wherein the control cables are arranged on pulleys at each articulation point.

16. The robotic arm of claim 15, wherein the cables are each arranged to run between a single pulley and a plain external bearing or bearing surface.

17. The robotic arm of claim 15, wherein the pulleys have axes corresponding to the first axes of articulation between the links.

18. A robotic arm for advancing adjacent a curved surface, the arm comprising a plurality of articulated links arranged sequentially in at least two groups, each group comprising at least three links articulated with respect to each other for relative movement substantially in a first plane, the groups being articulated with respect to each other for movement substantially in a second plane, which second plane is inclined with respect to the first plane, and a controller arranged to control movement of the links in the first plane, and to control movement of the groups in the second plane for remaining a predetermined distance from the surface, in which the tip of the arm comprises a plurality of links which are each articulated for movement in at least two planes.

19. A method of advancing a robotic arm to reach a predetermined object through a plurality of rows of objects, the objects in each row having a known size and spacing relative to one another, and the rows being offset with respect to each other, the method comprising:

advancing the arm between the objects in each row in turn to measure the position of at least one object in each row;
withdrawing the arm;
calculating the positions of all objects in all rows;
calculating a path between the objects for reaching the predetermined object; and
advancing the arm along the path.

20. The method of claim 19, wherein the path is an optimal path comprises either the shortest path, the path with the least curvature in a first plane of movement of the arm, or the path with the least curvature in a second plane of movement of the arm, or a combination of these.

21. The method of claim 19, wherein calculating the path comprises choosing an optimal starting point between any two objects.

22. A method of selecting a device for inspecting a rotary machine comprising a surface and a plurality of rows n, n+1, . . . of spaced objects, the objects in each row being in fixed relative positions, and the rows being in variable relative positions, the method comprising
(a) determining the positions of the objects relative to each other in each row;
(b) determining the position for the row n+1, relative to the position of row n, which results in the least optimal path for the device between the objects in row n and n+1;
(c) storing the said position of row n+1 and storing the said path;
repeating steps (b) and (c) for the next adjacent row of objects;
summing the said paths to determine the least optimal path through the machine, determining the required shape of the device when following the said least optimal path; and
selecting a device which is suitable for following the said path.

23. The method of claim 22, wherein the least optimal path is that which is the longest, has the greatest curvature in a first plane of movement of the arm, or the greatest offset in a second plane of movement of the arm, or a combination of these.

24. The method of selecting a device for inspecting a rotary machine comprising performing the method of claim 22 for every interstice between objects in each row.

25. The method of claim 22, wherein selecting the optimal device comprising selecting a smallest device, or a shortest device, or a device with the fewest links, or a combination of these.

* * * * *